United States Patent [19]

Jones et al.

[11] Patent Number: 5,478,901
[45] Date of Patent: Dec. 26, 1995

[54] OLEFIN POLYMERIZATION BY PI-ARENE LANTHANIDE CATALYSTS

[75] Inventors: Peter J. V. Jones, Billingham; John A. Segal, Halebarns; Robin Whyman, Chester, all of United Kingdom

[73] Assignee: BASF Aktiengesellschaft, Ludwigshafen, Germany

[21] Appl. No.: 133,090

[22] PCT Filed: Apr. 7, 1992

[86] PCT No.: PCT/GB92/00618

§ 371 Date: Jan. 19, 1994

§ 102(e) Date: Jan. 19, 1994

[87] PCT Pub. No.: WO92/17510

PCT Pub. Date: Oct. 15, 1992

[30] Foreign Application Priority Data

Apr. 8, 1991 [GB] United Kingdom ............... 9107378

[51] Int. Cl.$^6$ .................. C08F 4/52; C08F 10/06; C08F 10/02
[52] U.S. Cl. .............. 526/170; 526/129; 526/154; 526/123; 526/351; 526/352; 526/124.2; 526/124.5; 502/152
[58] Field of Search .................... 526/123, 129, 526/154, 170; 502/152

[56] References Cited

U.S. PATENT DOCUMENTS

| | | | |
|---|---|---|---|
| 4,299,936 | 11/1981 | Candlin et al. | 526/119 |
| 4,575,538 | 3/1986 | Hsieh et al. | 525/244 |
| 4,665,046 | 5/1987 | Campbell, Jr. | 502/102 |
| 4,801,666 | 1/1989 | Marks et al. | 526/123 |
| 5,321,106 | 6/1994 | LaPointe | 526/126 |

FOREIGN PATENT DOCUMENTS

| | | |
|---|---|---|
| 295829 | 12/1988 | European Pat. Off. |
| 371664 | 6/1990 | European Pat. Off. |
| 2653379 | 6/1977 | Germany. |
| 1551016 | 8/1979 | United Kingdom. |

OTHER PUBLICATIONS

F. A. Cotton, (1986) J Am Chem Soc 108, 4657–4658.

P. L. Watson et al. (1985) Accounts Chem. Res. 18, 51–56.

*Primary Examiner*—Mark Nagumo
*Attorney, Agent, or Firm*—Cushman Darby & Cushman

[57] ABSTRACT

Olefin polymerisation uses catalysts based in pi-arene complexes of lanthanide metals in particular such catalysts supported on hydrophobic or hydroxylic surfaces particularly of alumina or silica halide surfaces particularly magnesium chloride. Such catalysts will polymerise ethylene and also propylene to give a largely isotactic polymer without using an electron donor to enhance stereo regularity. They also do not require co-catalysts to activate polymeriscation.

11 Claims, No Drawings

OLEFIN POLYMERIZATION BY PI-ARENE LANTHANIDE CATALYSTS

This invention relates to the polymerisation of olefins, in particular 1-olefins such as ethylene and/or propylene, using as catalysts pi-arene complexes of lanthanide metals and to supported pi-arene complexes of lanthanide metals which are especially suitable as catalysts in such polymerisations.

Pi-complexes of aromatic compounds (arenes) and lanthanide metals in which the atoms of the lanthanides are in the zero valence state are known, for example, from published European Patent Specification No. 0295829 A which describes a range of such compounds and their use in chemical vapour deposition techniques.

The present invention is based on our discovery that pi-arene complexes of lanthanide metals carried on supports, particularly inorganic oxide or halide supports, are active as olefin polymerisation catalysts.

Accordingly, the present invention provides an olefin polymerisation catalyst comprising a pi-arene complex of one or more lanthanide metals carried on or reacted onto the surface of a solid support.

The invention includes a method of polymerising at least one olefin monomer which comprises bringing the olefin monomer(s) into contact with a catalytic amount of an olefin polymerisation catalyst comprising a pi-arene complex of one or more lanthanide metals carried on or reacted onto the surface of a solid support, thereby bringing about polymerisation of the olefin monomer(s).

The invention further includes the use of an olefin polymerisation catalyst comprising a pi-arene complex of one or more lanthanide metals carried on or reacted onto the surface of a solid support, as a catalyst in the polymerisation or copolymerisation of olefins.

The pi-arene complexes of lanthanide metals used in this invention are materials in which occupied pi-orbitals (bonding or antibonding) of an arene molecule interact with the available outer orbitals of a lanthanide metal atom. Most usually the arene is a carbocylic, typically a benzenoid, arene compound.

Particularly useful arenes include hydrocarbyl substituted benzenes in which there can be one or more, for example two or three, such hydrocarbyl substituents. Suitable benzenoid arene compounds can be selected from those of the formulae (Ia):

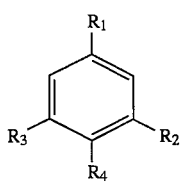

where

R$_1$ is a hydrocarbyl group;

R$_2$ and R$_3$ are each independently a hydrogen atom or a hydrocarbyl group; and R$_4$ is a hydrogen atom or, when R$_2$ and R$_3$ are both hydrogen atoms, a hydrocarbyl group.

Thus arenes of the formula I(a) include monohydrocarbyl substituted, 1,3- and 1,4-di-hydrocarbyl substituted and 1,3,5-trihydrocarbyl substituted benzenes. Further suitable arenes include compounds selected from those of the formula (Ib):

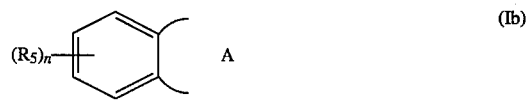

where each R$_5$ is a hydrocarbyl group;

n is 0, 1 or 2; and

A is a group of one of the formulae:

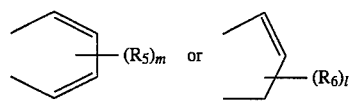

where

R$_6$ is a hydrocarbyl group;

m is 0, 1 or 2; and l is 0 or 1.

In particular, arenes of the formula (Ib) include naphthalene and hydrocarbyl substituted naphthalenes.

Hydrocarbyl substituents in the arenes of the pi-complexes, used in this invention are particularly alkyl groups typically C$_1$ to C$_{10}$, more usually C$_1$ to C$_6$, alkyl groups e.g. methyl, ethyl, propyl, iso-propyl, butyl, iso-butyl and tert-butyl groups. Particularly suitable arenes include toluene and 1,3,5-tri-tert-butyl benzene (TTBB).

Most usually, the pi-complex will be a 2:1 (molecular) arene:lanthanide complex. We believe that such complexes exist primarily as arene:lanthanide:arene 'sandwich' compounds. In such 2:1 pi-complexes the lanthanide metal atom is (formally) in the zeroth valence state. It is certain such complexes that form the subject matter of EP 0295829 A referred to above. Accordingly, the 2:1 complexes will typically have the formula (II):

where each An is independently a molecule of an arene, particularly one of the formula (Ia) or (Ib) set out above; and Ld is an atom of a lanthanide metal.

The lanthanide metal used in the complex can be any lanthanide metal from lanthanum (La, Atomic No 57) to Lutetium (Lu, atomic No 71) in the Periodic Table. Particularly suitable complexes include those of Neodynium (Nd, Atomic No 60), Samarium (Sm, Atomic No 62), Gadolinium (Gd, Atomic No 64), Erbium (Er, Atomic No 68) and Ytterbium (Yb, Atomic No 70). To date we have obtained especially good results using complexes of Gd and Er, in particular with toluene and TTBB.

The pi-arene complexes of lanthanide metals can be synthesized by methods generally known in the art. Conveniently they can be made by metal vapour synthesis as generally described in J. Chem. Soc. (Dalton), 1981, 1938 as referred to in EP 0295829 A, the disclosures of both these documents being incorporated herein by reference. The pi-complexes are typically highly coloured compounds having strong absorptions in the UV-visible region of the spectrum. They are also very reactive and need suitably careful handling, keeping them well separated from reactive materials that might destroy them e.g. water or air. It may be of benefit to keep them relatively cold to reduce the likelihood of undesired reactions.

According to the invention, particularly good olefin polymerisation catalysts can be obtained by supporting the catalytic pi-arene lanthanide complexes on a solid support material. The support material will usually be particulate and often, but not necessarily porous or spongiform to provide a large surface area for absorption or adsorption of the catalyst pi-complex and thus a large number of available catalytic sites. The support used in the supported catalysts of this invention can be entirely inert to the catalytic properties of the complex and polymeric materials such as polypropylene, polystyrene and PEEK (polyetheretherkstone). However, we have obtained particularly good results by using inorganic halides and oxides as supports. Among halides, alkaline earth metal halides are useful, especially magnesium chloride which itself may be provided as fine crystallites deposited on a base support e.g. of silica or alumina.

Among oxides those having hydrophilic and in particular hydroxylic surfaces are especially useful. Examples of such supports include silica, silicate and aluminosilicate materials including clays, and magnesium, aluminum, zirconium and titanium oxides. Substantially pure silica and unhydrated aluminum oxide (alumina) are especially useful and the use of these materials as catalyst supports forms a specific and particularly beneficial aspect of the invention.

The pi-arene complexes used in making supported catalysts of the invention are reactive towards inorganic halide and oxide surfaces and, thus, the practical supported catalysts will not have 'sandwich' compounds of the type described above as such on their surface. The exposed surfaces of oxides, including silicates and aluminosilicates, typically have hydroxyl groups on them. This is a result of the high reactivity of the exposed hydrogen atoms which pick up hydrogen from any available water, or other similar material, to form surface hydroxyl groups. We do not definitely know what reaction (or reactions) occur(s) between the pi-complex and the surface of the support but where the surface has, for example, surface hydroxylation we think it likely that the lanthanide metal will react with the O—M group to form a group:

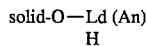
solid-O—Ld (An)
         H

This is a net insertion reaction with (starting with a 2:1 arene:lanthanide complex) loss of one molecule of arene. The pi-complexes are so reactive that we believe that they will readily undergo further reactions with closely adjacent hydroxyl groups on the surface of the support to form species which are inactive or much less active as olefin polymerisation catalysts. Thus, to maximize the number of active catalyst sites it is desirable to restrict the total number of hydroxyl groups on the surface of the support. This can be done by heating the support to reduce surface hydroxylation by driving off water or using suitable chemicals to react with and, thus, effectively remove a proportion of the surface hydroxylation. Oxide supports, as commercially available materials, such as silica and alumina can contain bound water as 'water crystallisation' (whether or not the oxides are themselves arystalline or amorphous) as well as having surface hydroxylation. Heating silica or alumina e.g. under vacuum, to temperatures above about 300° C. e.g. 350° to 500° C., for some hours e.g. 2 to 10 hours, seems to remove 'water of crystallisation' and some surface hydroxylation and significantly improves the properties of the catalyst of the invention made using the support. Event higher temperatures e.g. up to 800° C. or up to 1000° C., may be beneficial in reducing hydroxylation further. Of course, complete removal of hydroxylation would not be beneficial because it would remove binding sites for the lanthanide complex where the support is alumina, it will usually be desirable to avoid heating it to a temperature high enough to cause a phase change e.g. as can take place from gama-alumina to alpha-alumina at temperatures above about 800° C.

On halide supports such as $MgCl_2$, we believe that the pi-complexes react with the surface but we are not sure whether the reaction is with hydroxyl species on the surface of the halide or with the halide itself. Suitable halide supports can be made by methods analogous to those used to prepare similar such supports from Ziegler-Natta catalysts based on Ti(TV) species but, of course, avoiding the use of Ti e.g. as $TiCl_4$. Thus, to generate $MgCl_2$ supported on silica the support making generally described in EP 0371664 A can be used but halogenating the Mg species using dry pure HCl rather than $TiCl_4$. Thus, the silica can be treated with a magnesium alkyl e.g. Mg butyl and then with a suitable carboxylic acid followed by treatment with HCl.

That a significant reaction is occurring between the surfaces of these supports and the pi-complexes it plain as there is a significant colour change. The typically red, blue, green or purple colour of the complex (in solution) becomes typically a dark brown colour on oxide supports (silica or alumina) and a purple colour on magnesium chloride supports. Further the colour of the solution is rapidly removed by reaction of the pi-complex with the surface.

The dimensions of the supported catalyst are primarily determined by the support. Generally particles of catalyst support will be in the range 20 to 100 μm although where polymers are being used as supports the particles may be somewhat larger e.g. up to about 1 mm. Especially where the support is silica or alumina, or these materials are used as a base support e.g. for $MgCl_2$, the support will typically be porous with a specific surface area of from 10 to 2000 more usually 200 to 1000 $m^2$ $g^{-1}$.

The supported catalysts can be made straightforwardly by dispersing the dry support in a solution of the pi-complex in a suitable volatile solvent removing excess liquid and evaporating off the solvent from the treated support. The supported catalysts are not as reactive as the pi-complexes themselves but are sensitive to moisture etc. and suitable handling techniques will be used as are known in the art.

The processes and catalysts of the invention can be used to polymerise or copolymerise olefins. Usually the, or at least one of the, olefin monomer(s) is a 1-olefin typically a low molecular weight 1-olefin such as ethylene and/or propylene. The polymerisation can be a homopolymerisation to give, for example, polyethylene or polypropylene or a copolymerisation to give, for example, an ethylene/propylene copolymer, or a copolymer of ethylene and/or propylene with a higher olefin e.g., 1-heptene, or a diene such as butadiene to give an EPDM type ternary copolymer. Polymerisation reactions catalysed with pi-arene complexes of lanthanide metals according to the invention do not require the presence of the co-catalysts or activators such as aluminium alkyls or halo-alkyls, as are typically needed with conventional transition metal catalysts such as those based on vanadium, chromium and titanium, rather the polymerisation reaction seems to occur freely in the presence of the pi-complex and the olefin monomer. However, the presence of such co-catalysts or activators can be tolerated by the catalysts of this invention although usually incurring some loss of activity.

The polymerisation can be carried out in the presence of an organic solvent or diluent (so-called 'diluent' processes), with the olefin monomer in the liquid phase providing the reaction medium (so-called 'bulk' processes) or with the olefin monomer, at least partly, in the gas phase (so-called 'gas phase' processes) in which the reactor bed of growing particles of polymer is either fluidised by the gaseous monomer or is stirred to ensure good contact between the monomer and catalyst.

The reaction conditions for successful catalytic olefin polymerisation in this invention do not need to be extreme. We have successfully carried out polymerisation at ambient temperature and pressure. Particularly at ambient pressure the effective concentration of olefin monomer(s) such as ethylene (where this is being polymerised) is low and the use of super ambient pressure can be used to speed up polymer production. In practical industrial olefin polymerisation processes the pressures used are such as to bring the reaction temperatures close to, or even below in the case of 'bulk' processes, the dew point of the olefin monomer. Again to increase polymer production elevated temperatures up to about 100° C., more usually up to about 80° C. are commonly used. At 80° C. reaction pressures of the order of about 32 bar will typically be used. Such conventional temperatures and pressures can be used in the present invention.

The polymers produced by the method of this invention typically have high molecular weights comparable with those of currently available polyolefin polymers. A difference from such typical polymers is that the products of this invention tend to have a much wider range of molecular weights (as measured by gel permeation chromatographic polydispersity) than is typical with current catalysts. This can be advantageous in deliberately broadening the molecular weight range of polyolefins, especially polypropylene, e.g. by using combination catalysts.

The catalysts of the invention are reactive towards hydrogen such that hydrogen can be used as a chain transfer agent to modify the average molecular weight of the polymer product in olefin, particularly propylene, polymerisation reactions.

The polymerisation of propylene according to the invention gives a substantially isotactic polymer without the electron donors that are needed to produce isotactic material using currently available Ziegler-Natta catalysts such as those based on Ti(IV) species. The polymerisation of propylene using the catalysts of the invention forms a specific aspect of the invention.

The invention is illustrated by the following Examples. All parts and percentages are by weight unless otherwise stated.

MATERIALS pentane
was purified to remove olefins using sulphuric acid, thoroughly washed with water to remove acid residues and dried firstly over calcium chloride and then by distillation over Na/K alloy and stored in a Schlenk vessel over a potassium mirror under nitrogen.

n-heptane
was purified and stored as described for pentane.

alumina
used as support was dried in a quartz tube under vacuum ($10^{-3}$ mbar) at 550° C. for 4 hours. The vacuum was maintained during cooling and the material stored until use in the evacuated tube. Two grades of commercially available material were used Degussa grade C and Ketchen grade L.

magnesium chloride
used as support was prepared by ball milling under dry nitrogen at ambient temperature for two hours and the product stored until used under nitrogen.

ethylene and propylene
were polymerisation grade materials dried before use by passing through a drying column of 4A molecular sieves. Propylene was further purified immediately before use by passing through a trap containing potassium on glass wool.

metal pi-complexes
the pi-complexes used in the Examples were made by metal vapour synthesis using the technique generally described in J. Chem. Soc. (Dalton), 1981, 1938 as illustrated by the synthesis of neodynium di(TTBB) as follows:

In a rotary metal vapour synthesis apparatus (from Torrovap Industries Inc., Ontario, Canada) metallic neodymium was evaporated using electron beam heating. This vapour was co-condensed with TTBB vapour at −195° C. After warming to room temperature under dry argon, the product was dissolved in dry n-heptane removed from the reactor using an internal transfer tube and collected in a Schlenk tube as a deep burgundy red coloured solution. The solution was filtered through cellite to remove solid impurities. The solution had a measured maximum absorption at 535 nm. This is consistent for the formation of the 2:1 TTBB:neodymium pi-complex.

Further pi-complexes as set out below were also made by this method but substituting the appropriate starting materials. The pi-complexes, their colours and absorption maxima are as follows

| pi-complex | colour | UV-vis. abs. mas (nm) |
|---|---|---|
| Nd di(TTBB) | deep burgundy | 535 |
| Nd ditoluene | dark brown | |
| Sm di(TTBB) | deep green | |
| Gd ditoluene | blue-black | |
| Gd di(TTBB) | deep purple | 548 |
| Er di(TTBB) | red | 500 |

EXAMPLE S1

Preparation of Supported Catalyst

Neodymium di(TTBB) supported on silica (catalyst S1) was made by adding a solution of about 0.8 mmole of the Nd di(TTBB) pi-complex, made as described above, under dry argon to a slurry of 5 g of silica (previously dried overnight at 350° C.) in dry n-heptane. The colour of the solution was discharged virtually instantaneously and the silica assumed a uniform dark brown colour. Samples of 1 g of this product were used slurried in n-heptane in performing polymerisations.

EXAMPLES S2 TO S10

Using the same general method as described in Example S1, the following supported catalysts were made but substituting the corresponding pi-complex and/or support for the materials used in Example S1.

| | Supported on silica | |
|---|---|---|
| S2 | samrium | di(TTBB) |
| S3 | gadolinium | ditoluene |
| S4 | gadolinium | di(TTBB) |
| S5 | erbium | di(TTBB) |
| | Supported on alumina | |
| S6 | neodymium | di(TTBB) |
| S7 | gadolinium | di(TTBB) |
| S8 | erbium | di(TTBB) |
| | Supported on magnesium chloride | |
| S9 | gadolinium | di(TTBB) |
| S10 | erbium | di(TTBB) |

The alumina supports were of gamma-alumina obtained from Degussa which had been dried at 500° C. for at least 3 hours. Magnesium chloride supports were made by ball milling anhydrous catalyst grade material for 2 hours and the resulting powder was used as the support.

In addition to the supported catalysts four pi-complexes were prepared for use as unsupported catalysts for comparison under the codes U1 to U4:

| U1 | samarium | di(TTBB) |
|---|---|---|
| U2 | gadolinium | ditoluene |
| U3 | gadolinium | di(TTBB) |
| U4 | erbium | di(TTBB) |

EXAMPLES P1 TO P17

Ethylene polymerisation reactions were carried out using the catalysts U1 to U4 and S1 and S10. The following general route was used.

A volume of catalyst slurry containing 1 g of supported catalyst was transferred via syringe to a clean dry 250 ml glass vessel containing 100 ml dry deoxygenated n-heptane or toluene (distilled over sodium wire) and through which was passed a continuous flow of dry ethylene at atmospheric pressure. The suspension was agitated and allowed to react for 1 hour at ambient temperature. The suspension gradually thickened and decolourised as polymer growth occured. The contents of the vessel were filtered, washed with toluene and then heptane and thoroughly dried prior to weighing for yield. The polymer collected was identified as polyethylene by infra-red spectroscopy. The catalyst activity calculated from the polymer yield and the lanthanide analysis as g (polymers) mmol$^{-1}$ (lanthanide metal) hour$^{-1}$ is the average activity during the reaction. The results are set out in Table 1 below.

EXAMPLES P18

Propylene polymerisation reactions were carried out using the catalyst S8. The following general route was used.

An existing 4 liter capacity stainless steel autoclave equipped with an outer steam/water heating/cooling jacket and an anchor stirrer was washed with a solution of triethyl aluminium in an inert hydrocarbon diluent (alkane fraction nominal boiling at 180° C.) overnight at 65° C. to remove inhibitors. The traces of aluminium compound were removed by washing with diluent and the gas space than purged at 55° C. by admitting 300 mls of polymerisation grade liquid propylene and venting down slowly to atmospheric pressure. The catalyst component, about 5 g, as a slurry in heptane was then injected using a syringe through a serum cap on the top cover entry valve to the autoclave, 1.5 liters of liquid propylene were immediately added to the autoclave and the temperature was maintained at 65° C. with stirring. Unreacted propylene was removed by evaporation and the autoclave discharged after nitrogen purging. The slurry collected was filtered, washed with heptane and dried.

Infra-red diffuse refluctance spectroscopy detected an organic component which was identified as predominantly isotactic polypropylene.

EXAMPLES P19 TO P21

Further runs were carried out using various supported catalysts.

S7—reaction time of 1 hour.

Infra-red diffuse reflectance spectroscopy detected an organic component which was identified as predominantly isotactic polypropylene. Raman spectroscopy using a 514 nm argon laser line showed bands at 1459, 1436, 1329, 1358 and 398 wave numbers indicating the presence of isotactic polypropylene.

S9—reaction time 1 hour (using 4 g supported catalyst containing 40 mg of gadolinium suspended in 200 ml n-heptane.

The product collected from this experiment was suspended in 300 ml of 4M aqueous sulphuric acid and stirred at ambient temperature for 4 hours. On settling the acid layer was removed and replaced with water. After stirring the resulting slurry thoroughly to remove residual acid the suspension was filtered and the solid polymer recovered.

A sample of the product was pressed into a disc for analysis by infra-red spectroscopy. The product was identified as predominantly isotactic polypropylene. A small quantity of the product was dissolved in methylnaphthalene and subjected to gel permeation chromatography. This material gave an average molecular weight of 700000 D and had a polydispersity of 18.2.

S8—reaction time 2.5 hours.

Infra-red diffuse reflectance spectroscopy detected an organic component which was identified as predominantly isotactic polypropylene.

A small quantity of the product was dissolved in methylnaphthalene and subjected to gel permeation chromatography. This material gave an average molecular weight of 200,000 D and had a polydispersity of 11.1.

EXAMPLES S11 to S17

Preparation of Supported Catalyst

These preparations were carried out in a nitrogen filled glove box fitted with a recirculating drying and deoxygenating train.

A sample (ca. 25 mg) of a metal bisTTBB complex was placed in a 500 ml thick walled glass tubular reactor, pentane (100 ml) was added and the mixture stirred magnetically to form a solution. A portion (ca. 250 mg) of support was weighed in the glove box and added to the stirred solution in the reactor. Further pentane (ca. 30 ml) was used to wash any residual solid on the walls of the reactor into the solution.

EXAMPLE P22 TO P28

The reactor containing the supported metal complex was used to polymerise propylene as follows. The reactor lid (having a pressure gauge, temperature probe and a closed inlet valve) was fitted onto the top of the reactor tube and the sealed assembly was removed from the glove box and connected to the reactor manifold. Air in the system in the region of this connection was removed using a vacuum line and the reactor was pressurised to polymerisation pressure using propylene.

The suspension in the reactor vessel was stirred for a period of one hour at reaction temperature with the reactor pressure automatically maintained by a control valve between the reactor and the reservoir. No temperature control was applied during reaction. At the end of the reaction period the reactor was disconnected from the manifold and vented in a fume cupboard. The polymer product was recovered by filtration or evaporation to dryness and then drying under vacuum 10 mbar at 60° C. for ca. 2 hours.

The nature of the metal complex and the support used in Examples S11 to S17 and the reaction conditions used in Examples P22 to P28 are summarized in Table 2a below and the catalyst activities assessed from the yield of polymer and properties of the polymer produced are set out in Table 2b below.

The spectra of the polymers obtained in Examples P22 to P28 by recorded using a Raman laser microscope (488 nm) indicated that all the polymers were substantially isotactic.

The polymer obtained in Example P25 was further investigated. Integration if the isotactic methyl peak (maxm) in the $^{13}$C NMR spectrum (FX 270 MHz spectrometer on a solution in p-dichlorobenzene) as compared with all other methyls suggested that the polymer was 40.32 isotactic and the spectrum showed no sign of head to head polymerisation of propylene units.

TABLE 1

| Ex No | Catalyst | Medium | Activity (g.mmol$^{-1}$.hr$^{-1}$) |
|---|---|---|---|
| P1 | S1 | heptane | 6.07 |
| P2 | S6 | heptane | 9.52 |
| P3 | U1 | heptane | 2.24 |
| P4 | S2 | heptane | 2.94 |
| P5 | U2 | toluene | 2.60 |
| P6 | S3 | toluene | 11.59 |
| P7 | U3 | toluene | 3.56 |
| P8 | S4 | toluene | 1.97 |
| P9 | S7 | toluene | 0.79 |
| P10 | U3 | heptane | 8.13 |
| P11 | S4 | heptane | 17.02 |
| P12 | S7 | heptane | 57.83 |
| P13 | S9 | heptane | 29.26 |
| P14 | U4 | heptane | 6.49 |
| P15 | S5 | heptane | 26.21 |
| P16 | S8 | heptane | 94.38 |
| P17 | S10 | heptane | 38.71 |

TABLE 2a

| Ex No | Metal | Support | Reaction Conditions | | |
|---|---|---|---|---|---|
| | | | Loading (%) | Pressure (bar) | Temp. (°C.) |
| S11 | Er | Alumina | 2.6 | 5.0 | 24 |
| S12 | Er | Alumina | 9.4 | 5.0 | 65 |
| S13 | Er | Alumina | 8 | 5.0 | 24 |
| S14 | Er | Alumina | 10 | 8.5 | 24 |
| S15 | Er | Mg chloride | 10 | 8.5 | 24 |
| S16 | Gd | Alumina | 4.7 | 5.0 | 24 |
| S17 | Gd | Alumina | 2.3 | 5.0 | 24 |

TABLE 2b

| Ex No | Supported Metal Complex | Activity (g.mmol$^{-1}$) | Isotactic (%) | Head to Head % |
|---|---|---|---|---|
| P22 | S11 | 2.0 | | |
| P23 | S12 | 1.0 | | |
| P24 | S13 | 0.5 | | |
| P25 | S14 | 1.0 | 40.3 | 0 |
| P26 | S15 | 4.6 | | |
| P27 | S16 | 0.2 | | |
| P28 | S17 | 0.2 | | |

We claim:

1. An olefin polymerisation catalyst consisting essentially of a pi-arene complex of one or more lanthanide metals carried on or reacted onto the surface of a solid support, and wherein the arene is a compound having formula (Ia)

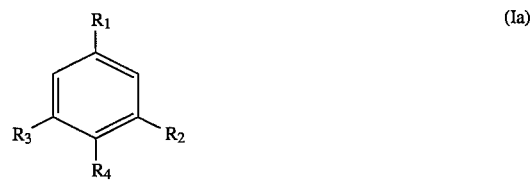

(Ia)

wherein
$R_1$ is a hydrocarbyl group;
$R_2$ and $R_3$ are each independently a hydrogen atom or a hydrocarbyl group; and
$R_4$ is a hydrogen atom or, when $R_2$ and $R_3$ are both hydrogen atoms, a hydrocarbyl group, or a compound having formula (Ib)

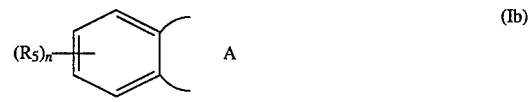

(Ib)

wherein
each $R_5$ is a hydrocarbyl group;
n is 0, 1 or 2; and
A is a group of one of the formulae:

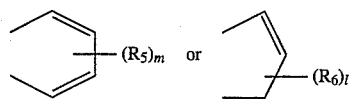

wherein
$R_6$ is a hydrocarbyl group;
m is 0, 1 or 2; and
l is 0 or 1.

2. A catalyst as claimed in claim 1 wherein the arene is of formula I(a).

3. A catalyst as claimed in claim 2 wherein the hydrocarbyl substituted benzene is an alkyl substituted benzene.

4. A catalyst as claimed in claim 2 wherein the arene is 1,3,5-tri-tert.butyl benzene.

5. A catalyst as claimed in claim 1 wherein the support is alumina or magnesium chloride.

6. A catalyst as claimed in claim 1 wherein the lanthanide metal is Gadolinium or Erbium.

7. A catalyst as claimed in claim 1 wherein the pi-arene complex is a 2:1 (arene:metal) complex.

8. A method of polymerising at least one olefin monomer which comprises bringing the olefin monomer(s) into contact with a catalytic amount of an olefin polymerisation catalyst as claimed in claim 1.

9. A method as claimed in claim 8 wherein the at least one olefin monomer is or includes propylene.

10. An olefin polymerisation catalyst consisting essentially of a pi-arene complex of gadolinium or erbium metal carried on, or reacted onto, the surface of a solid alumina, silica or magnesium chloride support, the arene being 1,3,5-tri-tert. butyl benzene, said catalyst being characterized by its ability of polymerise ethylene or propylene to give a largely isotactic polymer without using an electron donor to enhance stereo regularity and not requiring a co-catalyst to activate polymerisation.

11. A method of polymerising an olefin monomer which comprises contacting the monomer with a catalytic amount of a polymerisation catalyst as claimed in claim 10.

* * * * *